Nov. 7, 1950     D. K. McILVAINE     2,528,898
PILOT INDICATOR FOR SOLENOID VALVES
Filed Feb. 2, 1946
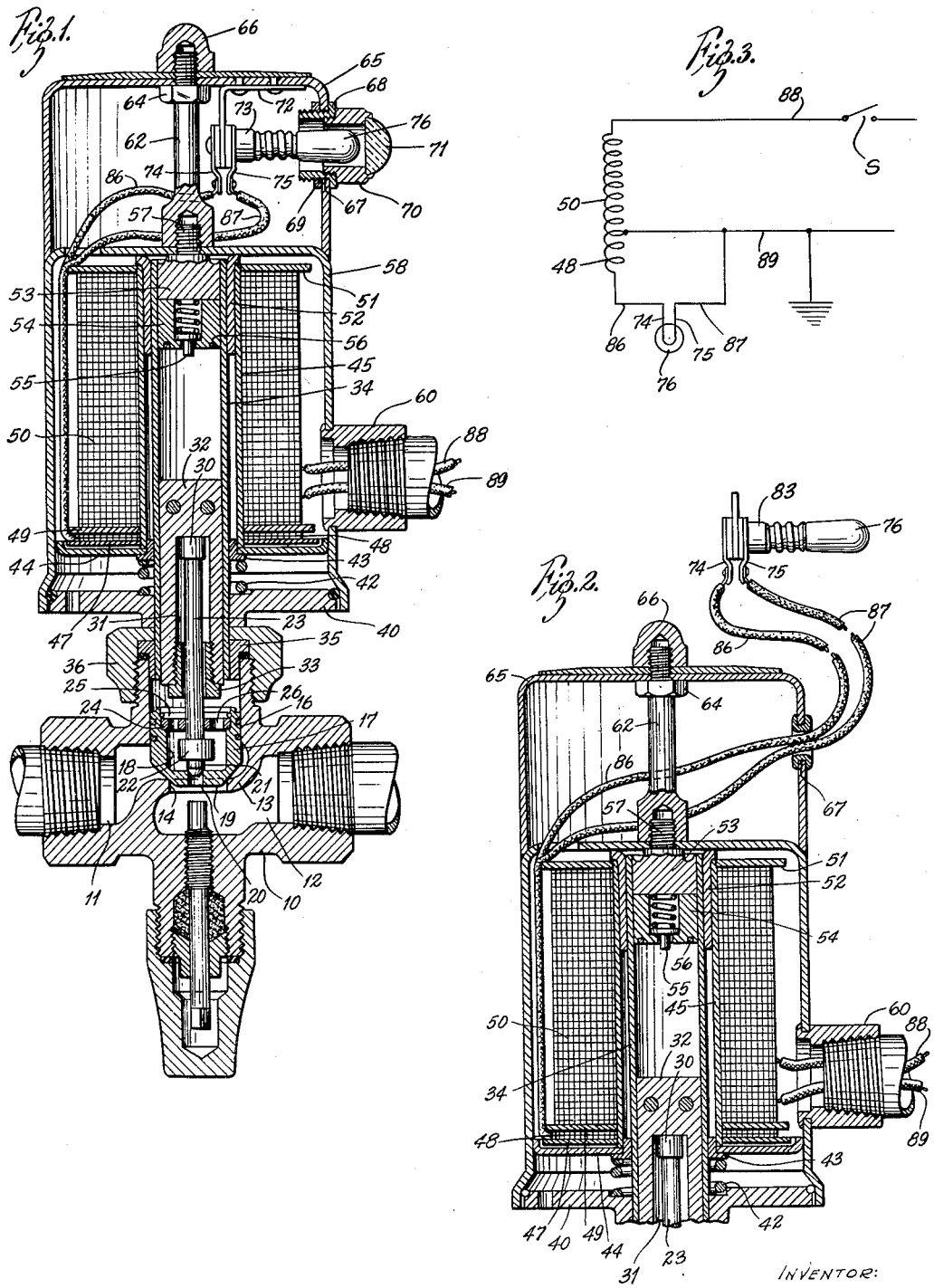
INVENTOR:
DOUGLAS K. McILVAINE,
By Kingsland, Rogers & Ezell
ATTORNEYS.

Patented Nov. 7, 1950

2,528,898

UNITED STATES PATENT OFFICE 2,528,898

PILOT INDICATOR FOR SOLENOID VALVES

Douglas K. McIlvaine, Des Plaines, Ill., assignor to Alco Valve Company, University City, Mo., a corporation of Missouri Application February 2, 1946, Serial No. 645,166

3 Claims. (Cl. 137—139)

The present invention relates to a pilot indicator for a solenoid valve.

It is an object of the invention to provide a solenoid having a main coil and a movable core, with a secondary coil associated with the main coil, and adapted to be magnetically coupled thereto through the core when the core is moved by the energization of the main coil from one position to another.

It is an object of the invention to provide a pilot indicator for a solenoid having a main coil and a core, the indicator being such as a light that is illuminated when the core is on one position, and which cannot be illuminated when the solenoid is in its other position. More particularly, it is an object of the invention to provide a pilot light for a solenoid valve that will be illuminated only when the valve is open and which cannot be illuminated when the valve is closed. It is a particular object of this invention to provide such a pilot light that is operated by a voltage induced from the main solenoid winding, with a construction whereby such induced voltage cannot be developed when the valve is not open.

In the drawings:

Fig. 1 is a vertical section through a valve of this type, with the pilot light attached to the cover;

Fig. 2 is a view of the solenoid with the pilot light shown as remote from the cover; and Fig. 3 is a typical wiring diagram.

The valve illustrated in Fig. 1 is of the pilot operating type, although it will be obvious that other types of valves may be used. It will also be obvious that, while this invention finds peculiar value as an indicator for valves, it may be used for other purposes. The valve shown includes a valve housing 10, having an inlet 11 and an outlet 12, with an internal partition 13 therebetween. A valve seat 14 is formed as part of a port through the partition 13.

The valve housing 10 has a cylindrical opening 16 extending downward from the top thereof and coaxial with the valve seat. This receives a main valve piston 17 which has a somewhat loose fit within the cylinder. This piston 16 is hollow, as at 18, and has a head 19 beveled so as to engage the valve seat 14 and to flare outwardly therefrom. A pilot port 20 passes through the head 19.

A pilot valve 21 is fitted within the opening 18 of the piston 17. This pilot valve is adapted to seat on the edge of the opening 20 through the head 19 of the main piston. A collar 22 is arranged on the pilot valve 21 and a stem 23 extends upwardly from this collar 22. A closure plug or disc 24 is seated across the top of the opening 18 on the valve piston 17 and is secured by a retainer ring 25. This plug 24 has ports 26 therethrough that are outward from the outer limits of the collar 22.

The stem 23 has a collar 30 at its top. The upper part of this stem is disposed in an axial opening 31 in a solenoid plunger or core 32. The lower end of the opening 31 is closed by a threaded plug 33, in the manner shown.

The plunger 32 is reciprocable within a tube 34 that has attached to its lower end a flanged collar 35 that may be held down by a union member 36 threaded onto the top of the valve housing 10.

The operating coil portion of the valve includes a bottom plate 40 engageable over the tube 34. It, in turn, receives one end of a coil spring 42, the upper end of which engages a flanged collar 43 that supports a disc 44, and, above this, another tube 45. The tube 45 constitutes the means about which the coils of the present solenoid are wound. Just above the bottom disc 44 is a coil disc 47. Above it is wound a first coil 48, consisting of only a few turns. Above the winding 48 is another coil disc 49, forming the lower end member for the main winding 50. The upper end of the coil 50 is held against an upper disc 51. The tube 45 may be flared out somewhat at its upper end to confine the disc 51. An inner sleeve 52 fits between the two tubes 34 and 45. It cooperates with the other sleeve 43 to hold the tubes properly spaced. The upper end of the inner tube 34 receives a plug 53, below which is attached a second plug 54 having a spring pressed expulsion button 55 and a ring 56.

The plug 53 has a threaded extension 57 at the top, over which a cover 58 is fitted. This cover extends down over the coil and other parts and is sealed against the bottom plate 40 with suitable packing. At one side of the cover 58, an outlet fitting 60 is secured to receive the wire connections for the coils.

Above the casing 58 is a combination stud and nut 62. It is threaded over the extension 57 on the plug 53, and thereby holds the cover 58 in place. It will be seen that the cover engages the top of the sleeve 52, and thereby holds all of the coil parts against the coil spring 42, so that they are yieldably supported in place. Upon removal of the cover 58, the various coil parts may be lifted off of the tubular member 34.

At its upper end, the stud 62 has a nut 64 that is suitably located to be engaged by the bottom of an upper cup-shaped cover 65. This last end cover is fitted over the top of the stud 62, which is threaded, and is held in position by a cap nut 66.

The upper cover 65 is provided with a side opening 67 therein. In the form of Fig. 1, the side opening is sized to receive a flanged and threaded sleeve 68 that is held in place by a nut 69 on the inner side of the cover. The sleeve 67, in turn, receives a cylindrical light containing member 70, having a lens 71 therein. The top of the cover 65, on its inner surface, receives and supports an angular bracket 72 that has a lamp socket 73 mounted thereon with suitable electrical terminals 74 and 75. The lamp socket is adapted to receive a lamp 76.

In the form shown in Fig. 2, the opening 67 need not be so large because it is adapted merely to provide an outlet for the two wires, whereby they may be directed to the lamp socket 83 which may be located in any desired point.

Typical connections are shown diagrammatically in Fig. 3. The two terminals 74 and 75 are connected by leads 86 and 87 to the ends of the short coil 48. The other coil 50 has leads 88 and 89 that are connected to a suitable source of power. The diagram of Fig. 3 shows the lamp 76 and the two leads 86 and 87 that are connected into the small winding 48. The two power lines 88 and 89 are connected into the coil 50.

The operation of the device is as follows:

The valve is adapted to be open when some control, such as the switch S in Fig. 3, is closed. This will energize the coil 50, which will thereby tend to raise the core 32. The valve may be any suitable valve, but is here shown as of the pilot type. When the core 32 rises, it will, toward the latter part of its stroke, pick up the collar 30 on the top of the pilot valve stem 23, and lift the pilot valve 21 from its seat in the port 20, by the time the core has reached its upper position. Only a small movement of the pilot valve is required. It will be observed that the collar 22 on the pilot valve stem will not cut off the ports 26 in the disc 24 when the collar 22 reaches its upper position and abuts the disc.

When both valves are closed, the inlet pressure of the fluid in the inlet 11 will be the same on the top side of the piston 17 as it is in the inlet, owing to the fact that the gas may leak around the main piston 17. When the pilot valve is opened, this gas, at inlet pressure, escapes out the port 20 through the bottom of the piston, whereupon inlet pressure acts on the annular and frusto-conical bottom surface of the piston 17 outside the limits of the valve seat 14, and lifts the piston so that the main valve is fully open. Subsequently, when the coil 50 is deenergized, the core 32 will drop and reclose the pilot valve 21, so that the pressures on the piston 17 are again equalized and the piston will close against the valve seat 14. It is not necessary to give a detailed description of the operation of the valve, because this mechanism is applicable to many varied kinds of valves or other similar devices.

When the coil 50 is energized, the adjacent turns 48 in the short winding will tend also to be energized by induction. When the core 32 is in the lower position shown, the magnetic coupling is so weak that the current induced in the coil 48 is too small to cause the lamp 76 to be lighted. Consequently, this light will indicate, by its condition, that the valve is closed. However, when the core 32 reaches its top position, wherein the valve is open, the core will establish adequate magnetic coupling between the main and pilot coils to provide sufficient induced voltage in the pilot coil to cause the lamp 76 to light, and thereby indicate that the valve is open.

It will be seen that the light acts as an indicator of the position of the core 32, and, consequently, will always indicate the condition of the valve itself, rather than the condition of the main coil 50. Even if the core 32 is not raised when the coil 50 is energized, there will be no indication of an open condition of the valve by the lamp 76.

The value of such a light as a sure indicator of the condition of the valve is obvious. It is also noteworthy that it attains its advantage without requiring any opening of the casing parts of the valve.

The invention may be given other applications wherein a secondary potential is required only when a solenoid core is in one of its positions.

What is claimed is:

1. In a valve, a housing having a valve mounted therein for movement from first to second position, a first electromagnetic coil, a second electromagnetic coil separated from the first coil, a magnetic core connected with the valve and operably disposed with respect to the first coil so that upon energization of the coil the core will be moved and the valve operated from first to second position, the second coil being positioned and the core being sized so that the second coil is magnetically coupled with the first coil by the core only when the core has been moved by the first coil away from its first position and toward its second position, and circuit connections between the ends of the second coil, whereby a circuit may be energized only when the valve is in second position.

2. In a valve, a housing having a valve mounted therein for movement from first to second position, a first electromagnetic coil, a second electromagnetic coil separated from the first coil, a magnetic core connected with the valve and operably disposed with respect to the first coil so that upon energization of the coil the core will be moved and the valve operated from first to second position, the second coil being positioned and the core being sized so that the second coil is magnetically coupled with the first coil by the core only when the core has been moved by the first coil away from its first position and toward its second position, and circuit connections between the ends of the second coil, whereby a circuit may be energized only when the valve is in second position, and an indicating means in the circuit connections to indicate that the valve is in second position.

3. In a mechanism of the kind described for indicating the position of a core, a first electromagnetic coil, a second magnetic coil normally separated from the first, a core movable from a first to a second position, a control device connected with the core to be operated when the same moves to its second position, the first coil having power, when energized, so to move the core, the core being of a size to magnetically couple the first and second coils when the core is in second position but not when the core is in its first position, and a circuit connected with the second coil to be energized when the second core is energized from the first by magnetic coupling through the core, and indicating means in the circuit, operated when the core is moved by the first coil to its second position.

DOUGLAS K. McILVAINE.

REFERENCES CITED

The following references are of record in the file of this patent:

UNITED STATES PATENTS

| Number | Name | Date |
| --- | --- | --- |
| 788,278 | Porter et al. | Apr. 25, 1905 |
| 1,622,862 | Detmers | Mar. 29, 1927 |
| 1,962,795 | Walker | June 12, 1934 |
| 2,161,960 | Hintze | June 13, 1939 |
| 2,197,320 | Shenton | Apr. 16, 1940 |
| 2,251,441 | Dillman | Aug. 5, 1941 |